May 18, 1943  C. W. CLARK  2,319,208
HARDNESS TESTER
Filed March 19, 1941  6 Sheets-Sheet 2

INVENTOR.
BY Clyde W. Clark
Daniel G Cullen
Attorney

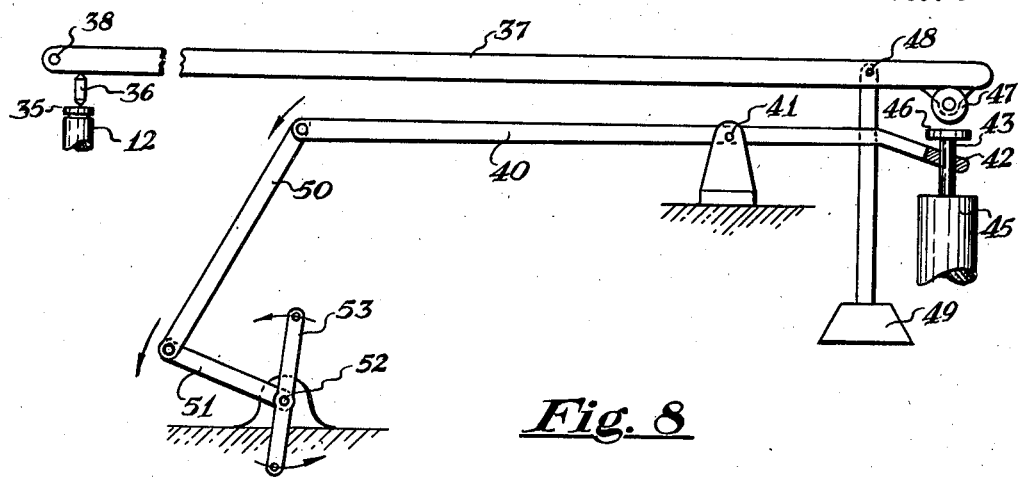
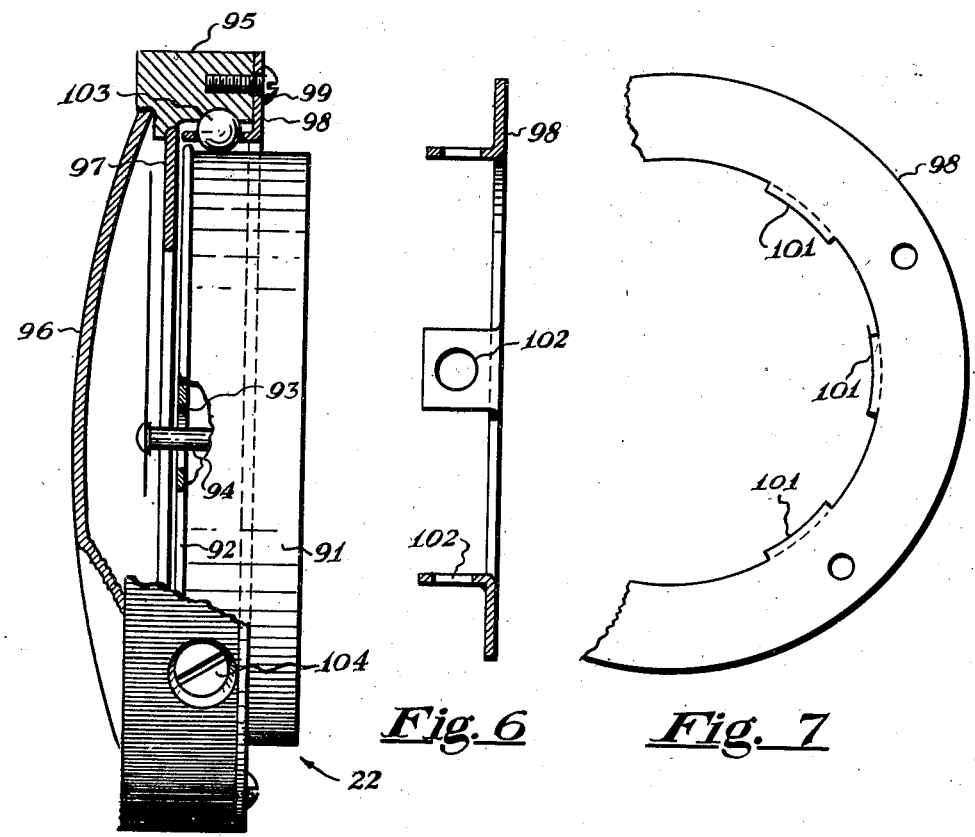
Fig. 8
Fig. 6
Fig. 7
Fig. 5

May 18, 1943.　　　C. W. CLARK　　　2,319,208
HARDNESS TESTER
Filed March 19, 1941　　　6 Sheets-Sheet 5

INVENTOR.
BY Clyde W. Clark
Daniel H Cullen
Attorney

May 18, 1943.  C. W. CLARK  2,319,208
HARDNESS TESTER
Filed March 19, 1941  6 Sheets-Sheet 6
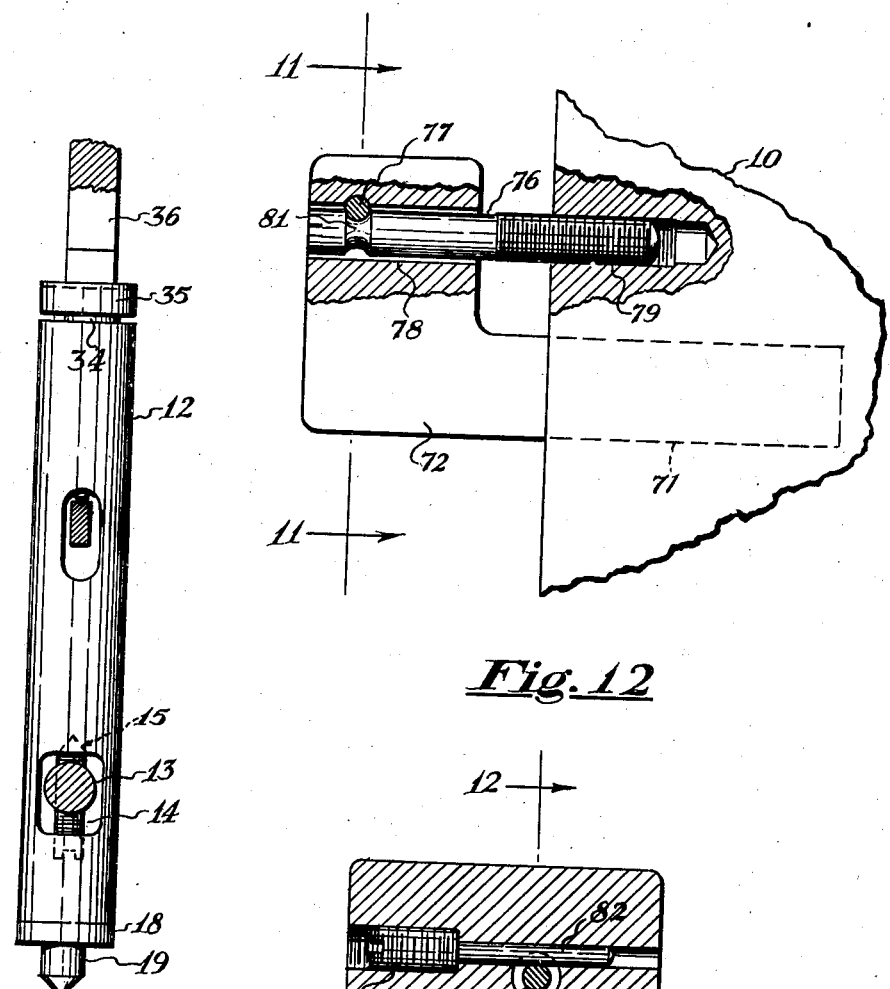
INVENTOR.
Clyde W. Clark
BY
Daniel H. Cullen
Attorney Patented May 18, 1943

2,319,208

UNITED STATES PATENT OFFICE 2,319,208

HARDNESS TESTER

Clyde W. Clark, Dearborn, Mich.

Application March 19, 1941, Serial No. 384,083

5 Claims. (Cl. 265—12)

This application relates to improvements in hardness testers, as will later be described upon reference to the appended drawings. In these drawings, Fig. 1 is a side view of the tester.

Figs. 5—6—7 show an arrangement for rotatably mounting a dial unit on the body of a gauge of the tester.

Figure 9:
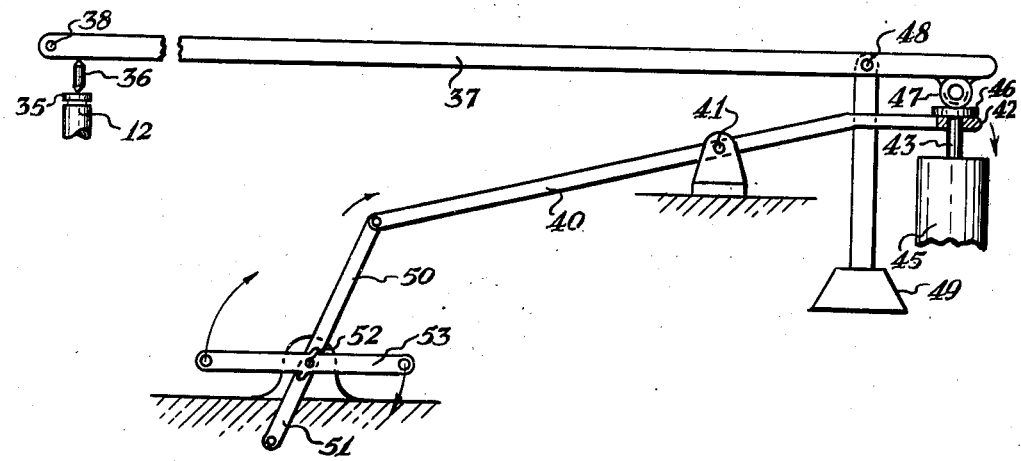

Figs. 8—9 show a load applying system of the tester, with the parts shown in two different positions.

Figure 10:
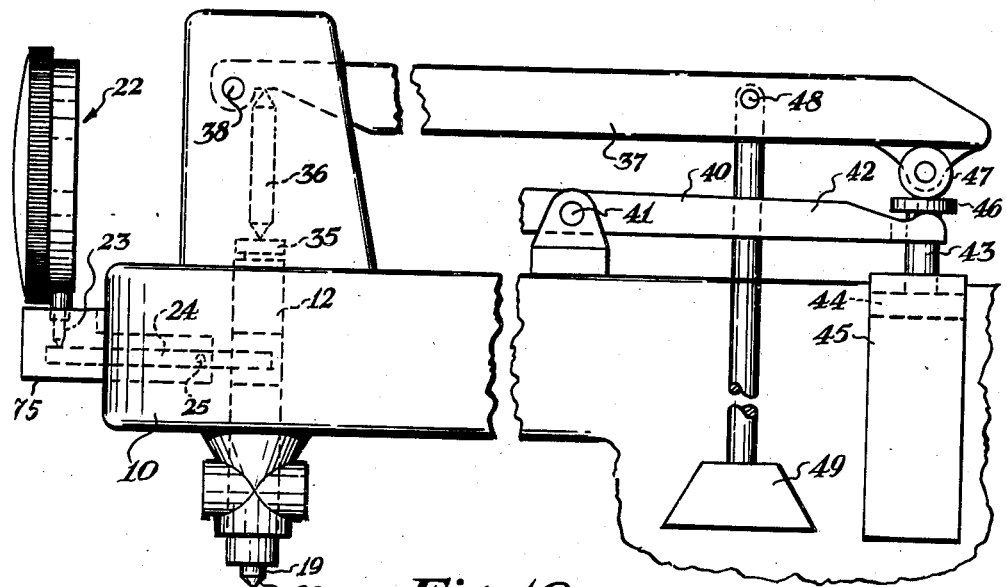

Fig. 10 is a fragmentary side view.

Figs. 11—12 show an arrangement for maintaining an adjustment of position of the gauge with respect to the spindle, Fig. 12 being a side view, and Fig. 11 being a section view.

Fig. 13 is a view of the spindle per se.

A hardness tester is an instrument designed to test the hardness of materials, such as metals, by penetration of a diamond point into the metal, the extent of penetration, under a pre-determined load, affording a measurement of the hardness.

The hardness tester hereof, in principle, is similar to known hardness testers, but represents a superior design, including a number of features which will now be described specifically.

The frame of the machine is C shaped and in its upper forward end is located the spindle or plunger system of the tester. The spindle is pressed down on its upper end by the power lever, under load, so that a diamond point on the lower end of the spindle can penetrate into a block of material to be tested, held against the diamond point by the elevating screw which is in the lower forward end of the frame, directly below the spindle.

Figure 1:
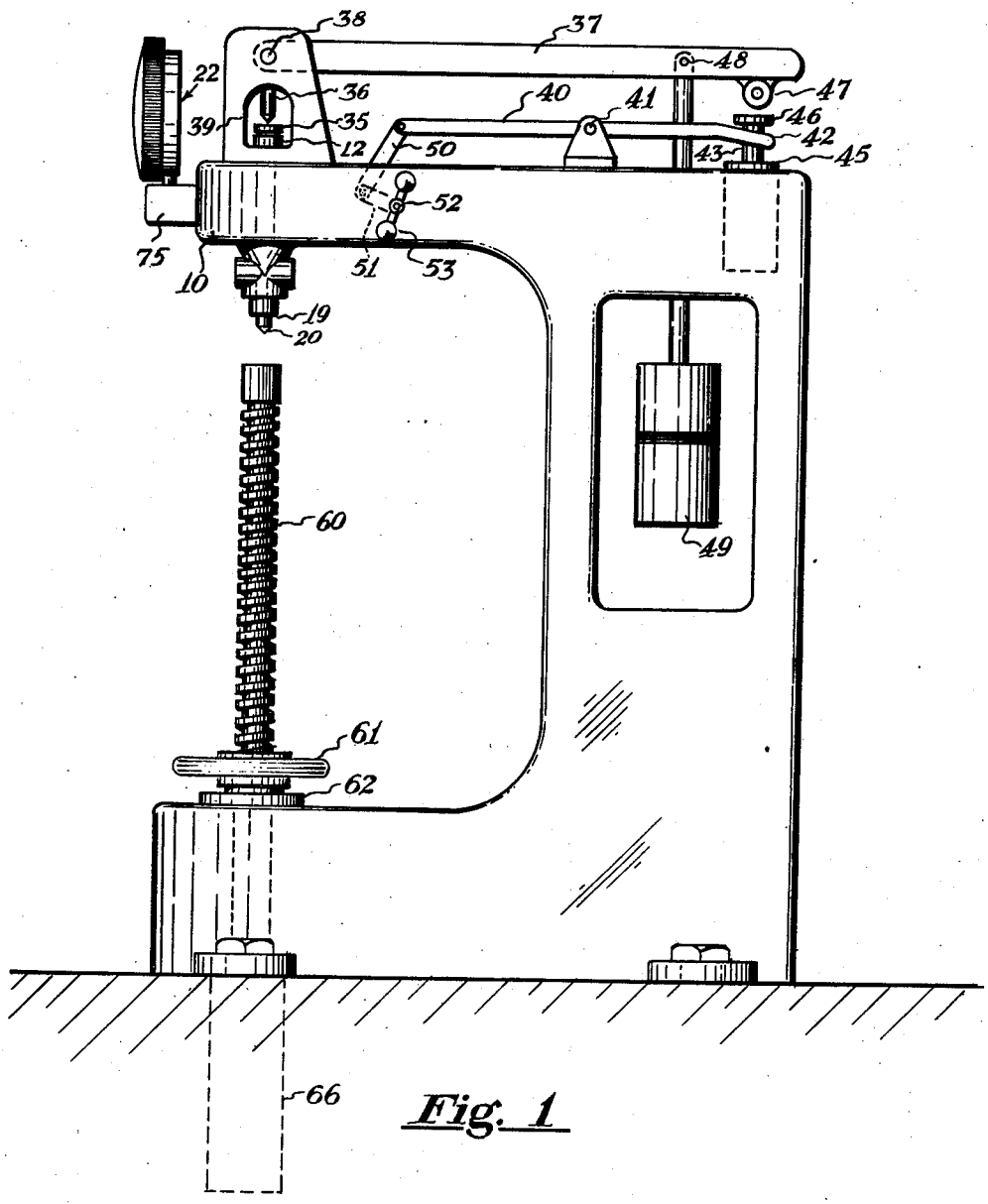
Figure 2:
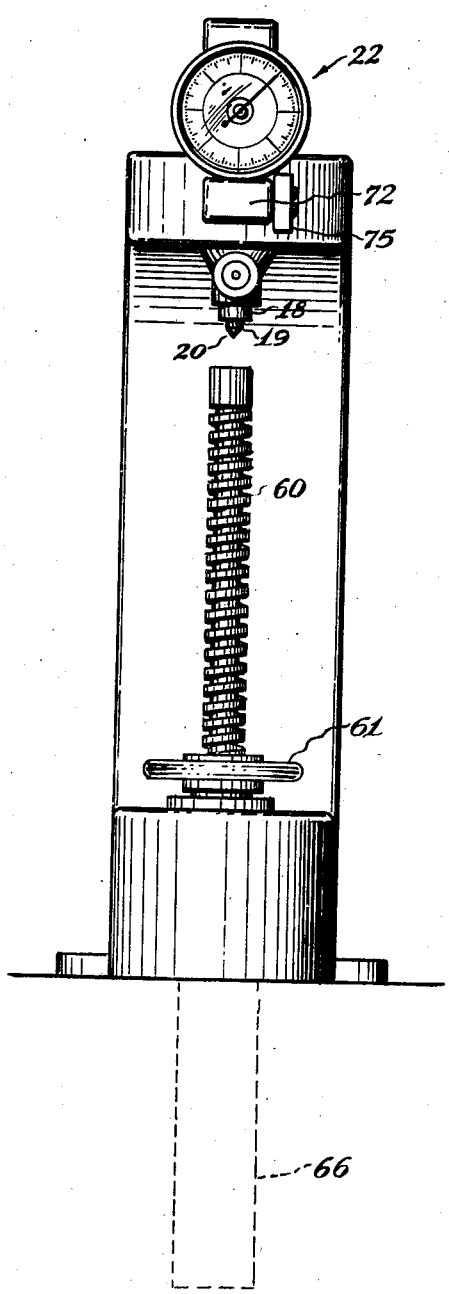
Fig. 2 is a front view.
Figure 3:
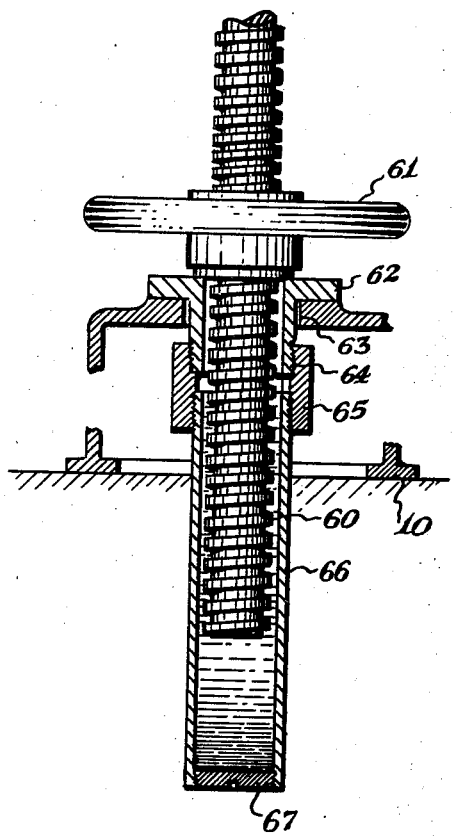
Fig. 3 shows an arrangement for lubricating an elevating screw of the tester.
Figure 4:
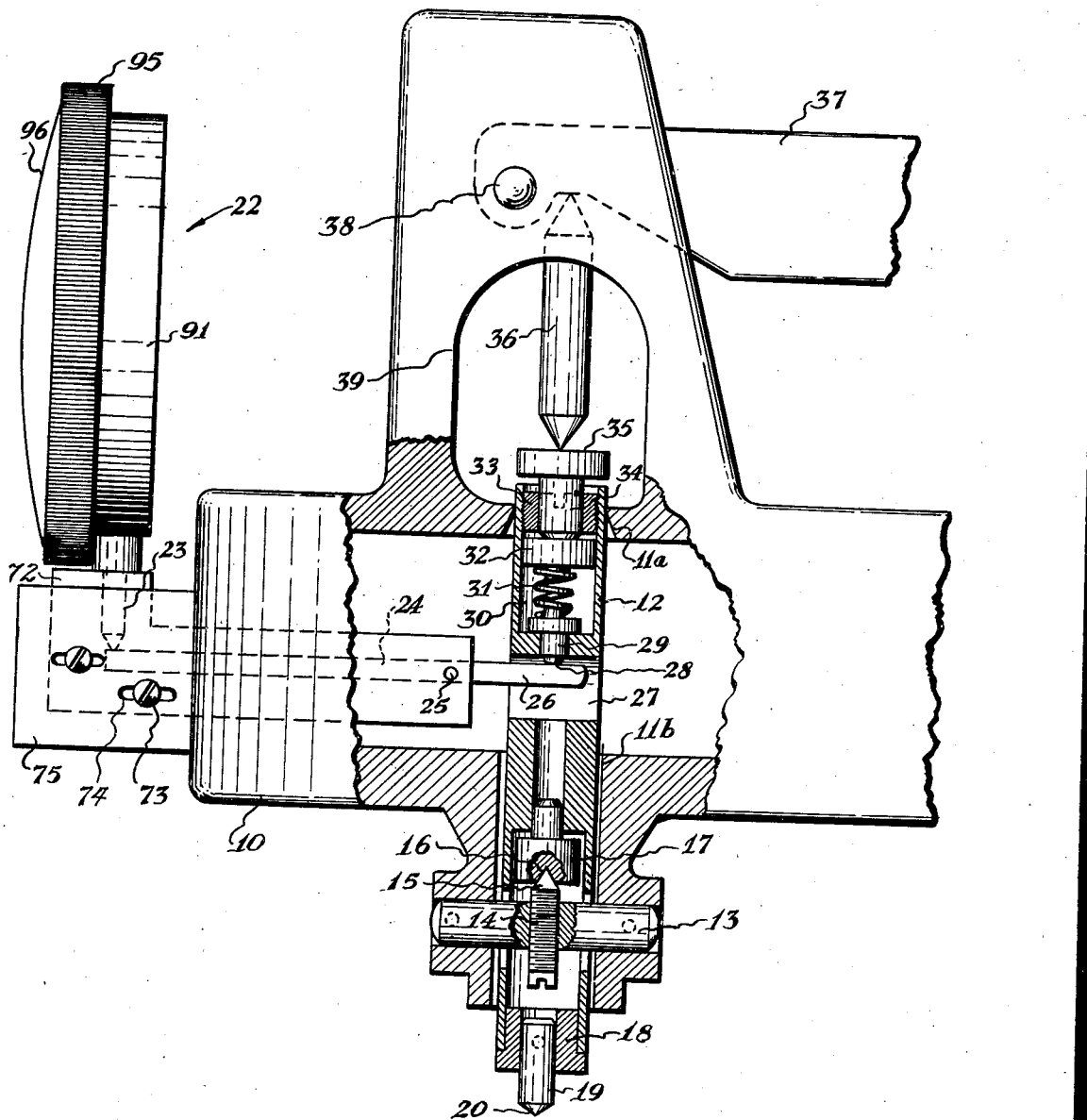
Fig. 4 shows a spindle system of the tester.

Referring particularly to Figure 1 it will be seen that this figure shows the upper or forward end of the frame 10. Aligned bores 11a and 11b of the frame receive a spindle body 12, the latter being supported so as to be movable up and down a very slight amount in the bores. The spindle body is in contact with the frame only at the very upper edge of the upper bore 11a, being free of all the rest of such bore, as well as of the bore 11b. The support is provided by a crosspin 13 held firmly in the frame 10 and through which is threaded an adjustable supporting screw 14 whose upper conical end 15 seats in a centering conical hole 16 of a block 17 slidably seated in and guiding the spindle body. The point 15 forms the sole support for the spindle, and block 17 closes the upper end of the lower hollow part of the spindle, so that point 15 is shielded against dirt in the atmosphere by the spindle, whose lower end is closed by a bushing 18 carrying a holder 19 at whose lower tip is the diamond point 20.

It will be observed that the spindle is supported in the frame solely by the cone point 15, which is within the spindle; thus, there is no possibility of cone hole 16 being clogged or affected by the presence of dirt, for dirt within the machine will pass out of the machine through the bore 11b and thus in no way affect the centering of the spindle, for centerpoint 15 is completely concealed.

On the forward end of the frame 10 is mounted a gauge 22 whose movable element 23 is moved upwardly by downward motion of the spindle, the operative connection between the spindle and the movable element 23 being established by a lever or actuating arm 24, fulcrumed at 25, an end 26 of the arm 24 passing through and into a cross slot 27 of the spindle to be engaged by a pressure point 28 formed as a lower tip of a block 29 disposed in and closing a hole of the spindle. This hole opens into a cavity 30 containing a coiled compression spring 31 which has its lower end seated on a shoulder of the block 29 and its upper end engaging a slidable washer 32 disposed beneath a hollow adjusting nut 33 threaded into the upper end of the spindle. Within this nut and seating on washer 32 is the shank 34 of a pad 35 on whose upper face is a cross groove receiving the lower knife edge of a link 36 whose upper knife edge is seated in a groove or slot in the lower face of the power lever 37 which is fulcrumed on the frame at 38, link 36 thus helping to center the spindle.

Parts 34—35—36 together comprise the load device of the tester, with the spindle being coaxial therewith and movable coaxially relative thereto and having its upper end engaged by pad part 35 of the load device. Nut 33 guides parts 12—35 in their relative coaxial movement, restraining the spindle and the load device against relative lateral movement. Spring 31 receives a thrust from the load device in the spindle.

The gap between pad 35 and the upper end of the spindle is initially adjustable by the nut 33 and is closed for the minor load setting of the tester gauge dial, i. e., the compression of spring 31, by elevation of the elevating screw when a part to be tested is held between that screw and the diamond point 20, thus determining the minor load setting of the machine for hardness testing. The relative position of pad 35 and spindle body 12 is made visible by viewing the size of the gap between them and determines the relative position of the spindle point 28 and the gauge. The nut 33 is completely concealed within the spindle, although the manipulable part of the adjusting nut, namely, the upper surface of the nut 33 (cross slotted for the reception of an adjusting tool), is exposed through a hole 39 of the frame, whenever desired, simply by manually lifting out the link 36 and the pad 35 through hole 39.

The assembly at the upper end of the spindle, is always completely immersed in the oil within the upper part of the spindle, such oil being held in place by the block 29 and washer 32.

The assembly of the parts of the spindle is such that servicing and adjustment of the parts is facilitated because the parts are instantly accessible from the outside of the spindle, and this is particularly true of the adjustable supporting screw 14 and the nut 33.

In addition, the minor load gap, between the spindle 12 and the pad 35, is always visible from the outside of the spindle. In the manipulation of the parts for minor load setting, the exposure of the gap for visibility is of assistance.

It will also be observed that penetrator point 20, spindle bearing point 15—16, gauge pressure point 28, the bearing point of pad 35 on washer 32, the bearing point of washer 32 on spring 31, the bearing point of spring 31 on block 29, and the bearing point of load link 36 on pad 35, are all in one common line, the centerline of the spindle 12.

Another feature is the novel system for raising the power lever and weight, and for freeing it for dropping and applying the load to the link 36. The left-hand end of the power lever 37 is pivoted on the frame 10 at 38, and when the power lever is pulled down, there will be transmitted to link 36 and spindle 12 a force to press the diamond point 20 into the object being tested. In the testing operation, the power lever, with its weight, is first raised, and thereupon is freed so that the weight can pull the power lever down and thus cause the diamond point 20 to penetrate the object being tested. For raising the power lever 37 there is provided the system shown. That system includes an elevating arm 40 pivotally mounted at 41 on the frame of the machine, and having its right end 42 forked to straddle a piston rod 43 connected to a piston 44 sliding within a dash-pot 45, the upper end of the rod 43 having a head 46 adapted to engage a roller 47, mounted on the right end of the power lever 37 near the point 48 where the weight 49 is suspended from the power lever. The left end of the elevating arm 40 is connected by a toggle linkage 50—51 to a cross shaft 52 journalled in the frame of the machine, and having an exposed hand lever 53.

The operation is as follows:

When the handle 53 is in the power lever raised position, the toggle linkage 50—51 will hold the dash-pot piston rod 43 and the power lever 37 elevated, and there will be no load applied to the spindle 12. When the handle 53 is moved clockwise, however, to the power lever freeing position, the elevating arm 40 will rotate clockwise on pivot 41 to free itself from the head 46 of the dashpot piston rod 43, thus to free the power lever 37 so that weight 49 can pull the power lever downwardly, completely free of the elevating mechanism parts, and with its movement restrained solely by the dash-pot piston. Thus, during the time that the penetration force is being applied to the diamond point, the power lever and spindle are completely free of the elevating arrangement and thus the penetration is not affected by friction existing within the various bearings and pivots of the elevating system for the power lever.

Another feature is a novel arrangement for constantly oiling the elevating screw 60 which passes through the lower forward end of the frame 10 to be manipulated by the conventional hand wheel 61. The screw passes clear through a bushing 62, seated in a hole 63 of the frame and having its lower end threaded at 64 to support a sleeve 65 which is internally threaded for receiving the upper end of an oil filled pipe 66, whose lower end is closed by a plug 67. The pipe is long enough to receive the screw 60, when the latter is in its full down position and for this reason extends well below the lower surface of the frame, as does the screw when the screw is pulled down. Since the pipe is completely filled with oil, the lower portion of the screw is constantly lubricated and this causes the screw and the engaging threads of the hand wheel to be lubricated. The oil level is of course well below the upper edge of the bushing 62, so that oil will not leak out of the machine above the bushing.

As previously mentioned, the downward movement of the spindle, when a load is applied to its upper end, and the upward movement of the spindle body, with respect to pad 35, for initial setting of the dial for minor load, is accompanied by a rocking of the lever or actuating arm 24 on a fulcrum 25, and this in turn causes vertical movement of the movable part 23 of the gauge 22. A feature hereof is a novel arrangement for adjustably positioning the gauge 22 with respect to the frame, so as to adjust the distance between the spindle bearing point 28 and the fulcrum 25 of arm 24. Such adjustable holding and supporting arrangement for the gauge will, therefore, now be described. A horizontal bore of the frame receives the hollow part 71 of a holder 72, in which part 71 is disposed the actuating arm 24 with the fulcrum 25 being in the form of a pin passing through the part 71 and fulcruming the arm 24 therein. The forward end of the holder 72 is in the form of a block, having laterally extending tapped holes for receiving the shanks of holding screws 73 passing through slots 74 of a bracket 75 formed on the upper forward end of the frame 10. Slots 74 permit holder 72 to be moved slightly towards and away from the spindle 12 for adjustment of the distance 25—28. The gauge 22 is non-adjustably, but removably supported on and held by the block of the holder 72. For setting the adjustment of the position of the holder 72, there are provided an adjusting screw or stud 76 and a locking pin 77. Screw 76 has its axis parallel to the direction of adjustment of fulcrum 25 with respect to the bearing 28, and is disposed in a clear hole 78 of block 72 and threads into a tapped hole 79 of frame 10. It is cross-grooved, as at 81, to interlock with pin 77, whose axis is transverse thereof. Pin 77 threads in a tapped hole of block 72 and has an extension 82 interlocking with the groove 81 of screw 76. Thus holder 72 may be locked in any adjusted position with respect to the frame 10, and screws 73 securely fasten the holder 72, in place with respect to the casting after the adjustment is determined by manipulation of screw 76 and pin 77.

In the event the holder 72 is to be removed from the casting and is to be returned to the casting in its previously adjusted position, this may be done very simply. Screws 73 are threaded out and pin 77 is pulled out to permit the holder 72, to be pulled clear of the stud 76 which is left in place. Thereafter, the holder 72 may be replaced and moved with respect to the frame until the cross hole for pin 77 aligns with the cross groove 81 in stud 76, this alignment providing an assurance that holder 72 has been restored to the position it previously occupied. When this alignment occurs, the pin 77 is restored to its original position to interlock the holder to the screw 76, whereafter the side bracket screws 73 are tightened and the holder mounting is now completed.

The gauge of a hardness tester consists of a body and an indicator needle as one (stationary) part, and a dial rotatably mounted on the body, the dial being formed as part of a dial unit comprising a ring having a covering crystal, so that the three parts, namely the ring, the dial, and the crystal rotate as a unit on and around the body. For providing freedom of movement of that dial unit with respect to the body, the construction herein disclosed has been provided and the same will now be described. It will be seen that the gauge as a whole, referenced 22, consists of a body 91 on whose front face is a disc 92 having a central hole 93 through which passes the needle shaft 94 of the body. Mounted on the body 91, in a manner to permit its rotation, is the dial unit, the latter consisting of a ring 95, having therein a crystal 96 and an annular dial 97, the three parts being intersecured to form a unit. For mounting the ring 95 on the body 91, there is provided a retainer 98, secured to the ring 95 by screws 99, and having inwardly projecting tabs or lugs 101, peripherally spaced, and apertured at 102, for receiving bearing balls 103. A hole in the ring 95, closed by a screw 104, permits the balls 103 to be dropped into the holes 102 of the retainer lugs 101 through the ring 95. When the assembly of the parts is completed, as shown disc 92 prevents separation of the dial unit endwise off the body 91, and freedom of movement of the dial unit with respect to the body 91 is obtained.

Now having described the hardness tester herein shown, reference should be had to the claims which follow:

1. In a hardness tester, a spindle upon which is applied a load and whose lower end has a penetrating point, and means for supporting and centering the spindle, the means comprising a stationary cross member to which the spindle is movably connected at a point within a cavity of the latter, a frame having a vertical bore containing but clear of the spindle, with the ends of the cross member, outside the spindle, supported in side walls of the bore, and means for connecting the cross member to the spindle comprising a pin and a block within the spindle cavity, the pin being mounted on and extending upwardly from the cross member and having a cone point receiving a centering cone hole of said block, the latter being in the spindle, the cone point and cone hole forming a spindle bearing centered on the centerline of the spindle.

2. In a hardness tester having a frame, a gauge holder mounted on the tester frame, an actuating arm fulcrumed thereon, a movable element of the tester engaging the arm and means for mounting the holder and arm as a unit in adjusted position with respect to the frame so as to establish any desired predetermined relation between the fulcrum point and the element engaging point of the arm, said means including a stud adjustably positioned in the frame and mounting the holder, and means non-adjustably positioned in the holder manipulable for releasably intersecuring the holder and the adjustably positioned stud.

3. In a hardness tester, a load device, a spindle coaxial therewith and movable coaxially relative thereto and whose upper end is engaged by a part of the load device to receive the load there, and whose lower end has a penetrating point, the spindle having its upper end formed with a cavity, the lower end of the load device being within the cavity, a minor load spring within the cavity for receiving a thrust from the load device, an adjusting nut movable along the axis of the spindle and load device for varying the minor load gap between the upper end of the spindle and that part of the load device engaging it and thus varying the effective compression on the minor load spring when the gap between the spindle and load device is taken up.

4. In a hardness tester, a load device, a spindle coaxial therewith and movable coaxially relative thereto and whose upper end is engaged by a part of the load device to receive the load thereof, and whose lower end has a penetrating point, the spindle having its upper end formed with a cavity, the lower end of the load device being within the cavity, a minor load spring within the cavity for receiving a thrust from the load device, cooperating portions of the load device and the spindle engaging, for guiding them in their relative coaxial movement and restraining them against relative lateral movement, an adjusting nut movable along the axis of the spindle and load device for varying the minor load gap between the upper end of the spindle and that part of the load device engaging it and thus varying the effective compression on the minor load spring when the gap between the spindle and load device is taken up.

5. In a hardness tester, a load device, a spindle coaxial therewith and movable coaxially relative thereto and whose upper end is engaged by a part of the load device to receive the load thereof, and whose lower end has a penetrating point, the spindle having its upper end formed with a cavity, the lower end of the load device being within the cavity, a minor load spring within the cavity for receiving a thrust from the load device, cooperating portions of the load device and the spindle engaging, for guiding them in their relative coaxial movement and restraining them against relative lateral movement, an adjusting nut movable along the axis of the spindle and load device for varying the minor load gap between the upper end of the spindle and that part of the load device engaging it and thus varying the effective compression on the minor load spring when the gap between the spindle and load device is taken up, the adjusting nut being the aforesaid portion of the spindle engaging a cooperating portion of the load device for restraining relative lateral separation of the spindle and the load device.

CLYDE W. CLARK.